(12) United States Patent
Namuduri et al.

(10) Patent No.: US 9,979,336 B2
(45) Date of Patent: May 22, 2018

(54) METHOD AND APPARATUS FOR GENERATOR CONTROL

(71) Applicant: GM GLOBAL TECHNOLOGY OPERATIONS LLC, Detroit, MI (US)

(72) Inventors: Chandra S. Namuduri, Troy, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 215 days.

(21) Appl. No.: 14/810,738

(22) Filed: Jul. 28, 2015

(65) Prior Publication Data

US 2017/0033716 A1 Feb. 2, 2017

(51) Int. Cl.
| | | |
|---|---|---|
| *H02P 9/00* | (2006.01) | |
| *H02P 23/26* | (2016.01) | |
| *B60K 1/00* | (2006.01) | |

(52) U.S. Cl.
CPC ............... *H02P 9/00* (2013.01); *B60K 1/00* (2013.01); *H02P 23/26* (2016.02)

(58) Field of Classification Search
CPC .............. H02P 9/105; H02P 9/00; H02P 9/26
USPC .......................................................... 322/20
See application file for complete search history.

(56) References Cited

U.S. PATENT DOCUMENTS

| | | | | |
|---|---|---|---|---|
| 4,465,943 A * | 8/1984 | Risberg | ............ | H02J 9/066 307/127 |
| 4,814,677 A * | 3/1989 | Plunkett | ............ | H02P 6/08 318/400.02 |
| 5,731,689 A * | 3/1998 | Sato | ............ | H02J 7/1446 322/20 |
| 6,265,841 B1 * | 7/2001 | Buthker | ............ | H02P 6/085 318/400.28 |
| 6,940,259 B2 * | 9/2005 | Suzuki | ............ | H02P 9/00 322/20 |
| 7,116,080 B2 * | 10/2006 | Chen | ............ | H02M 7/1623 322/24 |
| 7,135,784 B2 * | 11/2006 | Murty | ............ | F02N 11/04 290/36 R |
| 7,919,949 B2 | 4/2011 | Namuduri | | |
| 8,064,227 B2 * | 11/2011 | Namuduri | ............ | H02M 7/219 363/108 |
| 8,310,212 B2 * | 11/2012 | Masumoto | ............ | H02J 7/163 322/28 |

(Continued)

FOREIGN PATENT DOCUMENTS

| | | |
|---|---|---|
| DE | 10317207 A1 | 10/2003 |
| DE | 10 2009 045 826 A1 | 4/2011 |
| DE | 102011003946 A1 | 8/2012 |

*Primary Examiner* — Tulsidas C Patel
*Assistant Examiner* — Charles Reid, Jr.

(57) ABSTRACT

A generator system includes an AC machine including a plurality of armature coils and a rectifier circuit electrically coupled to the armature coils. The rectifier circuit includes a plurality of switches. The generator system additionally includes a sensor device electrically coupled to a control circuit. The sensor device is configured to determine a rotor position of the AC machine. The control circuit determines a desired phase angle between a phase current and an induced voltage of the AC machine and provides a control signal to the rectifier circuit to switch the switches on and off to convert an AC signal to a DC signal and to control the rotor position of the AC machine to achieve the desired phase angle.

20 Claims, 5 Drawing Sheets

(56) References Cited

U.S. PATENT DOCUMENTS

| | | |
|---|---|---|
| 8,497,664 B2 | 7/2013 | Hao |
| 2002/0089866 A1* | 7/2002 | Keim .................. H02J 7/0054 |
| | | 363/89 |
| 2003/0034755 A1 | 2/2003 | Krefta |
| 2003/0075997 A1* | 4/2003 | Keim .................. B60L 11/1803 |
| | | 310/68 D |
| 2010/0060245 A1* | 3/2010 | Namuduri ................ H02P 9/02 |
| | | 322/89 |

\* cited by examiner

METHOD AND APPARATUS FOR GENERATOR CONTROL

TECHNICAL FIELD

This disclosure is related to control of a generator having an active bridge rectifier.

BACKGROUND

The statements in this section merely provide background information related to the present disclosure. Accordingly, such statements are not intended to constitute an admission of prior art.

Vehicles employ generators that are driven by a belt coupled to the vehicle engine to generate electrical power. Automotive electrical generators typically employ an AC synchronous machine with three-phase or multi-phase stator windings, a DC excitation winding on a claw-pole rotor, a voltage regulator and a diode bridge rectifier to produce a DC output. The excitation current of the synchronous machine is controlled by the voltage regulator to regulate the DC output voltage of the generator. Permanent magnets have been employed sometimes in the claw-pole device to increase the power output and efficiency of the generator for a given generator.

High efficiency generators usually employ shaped conductor stator windings to reduce copper losses, thinner stator laminations to reduce iron losses, low friction bearings, a laminated rotor construction and permanent magnetic excitation.

As mentioned above, known generator assemblies typically employ a diode bridge to convert the AC current to a DC current where the diodes conduct depending on the propagation direction of the current through the three-phase coils or the multi-phase coils.

The three-phase diode bridge rectifier converts an AC current to a DC current, where the diodes conduct depending on the propagation direction of the current through the three-phase coils or the multi-phase coils. A three-phase machine generally requires six diodes and a n-phase machine generally requires a number of diodes two times the number phases (n). Known generator systems include an active bridge rectifier employing low on-resistance switches, such as MOSFET switches, for converting the AC current from the machine to a DC current.

In known high efficiency generators with an active bridge rectifier the phase angle between the phase voltage and current is fixed, and accordingly the maximum output current/power is also fixed for a given generator speed and output voltage.

SUMMARY

A generator system includes an AC machine including a plurality of armature coils and a rectifier circuit electrically coupled to the armature coils. The rectifier circuit includes a plurality of switches. The generator system additionally includes a sensor device electrically coupled to a control circuit. The sensor device is configured to determine a rotor position of the AC machine. The control circuit determines a desired phase angle between a phase current and an induced voltage of the AC machine and provides a control signal to the rectifier circuit to switch the switches on and off to convert an AC signal to a DC signal and to control the rotor position of the AC machine to achieve the desired phase angle.

BRIEF DESCRIPTION OF THE DRAWINGS

One or more embodiments will now be described, by way of example, with reference to the accompanying drawings, in which:

FIG. 3-1 graphically depicts the output power of a generator system, at 12 volts, at each of a phase angle of 0 degrees, 15 degrees and 30 degrees, as well as the output power of a generator system having a diode bridge rectifier;

FIG. 3-2 graphically depicts the output power of a generator system, at 13 volts, at each of a phase angle of 0 degrees, 15 degrees and 30 degrees, as well as the output power of a generator system having a diode bridge rectifier;

FIG. 3-3 graphically depicts the output power of a generator system, at 14 volts, at each of a phase angle of 0 degrees, 15 degrees and 30 degrees, as well as the output power of a generator system having a diode bridge rectifier;

FIG. 3-4 graphically depicts the output power of a generator system, at 15 volts, at each of a phase angle of 0 degrees, 15 degrees and 30 degrees, as well as the output power of a generator system having a diode bridge rectifier;

FIG. 4-1 graphically depicts an increase in output power of a generator system having a 15 degree phase angle control, compared to generator system having an active bridge rectifier with no phase angle control, for a range of voltages;

FIG. 4-2 graphically depicts an increase in output power of a generator system having a 30 degree phase angle control, compared to generator system having an active bridge rectifier with no phase angle control, for a range of voltages;

FIG. 5-1 graphically depicts voltage control both with and without phase advance in a generator system operating at 1800 RPM; and FIG. 5-2 graphically depicts voltage control both with and without phase advance in a generator system operating at 3000 RPM.

DETAILED DESCRIPTION

The following discussion of the embodiments of the invention directed to an apparatus and method of controlling a generator system employing an active rectifier bridge is merely exemplary in nature, and is in no way intended to limit the invention or its applications or uses.

Figure 1:
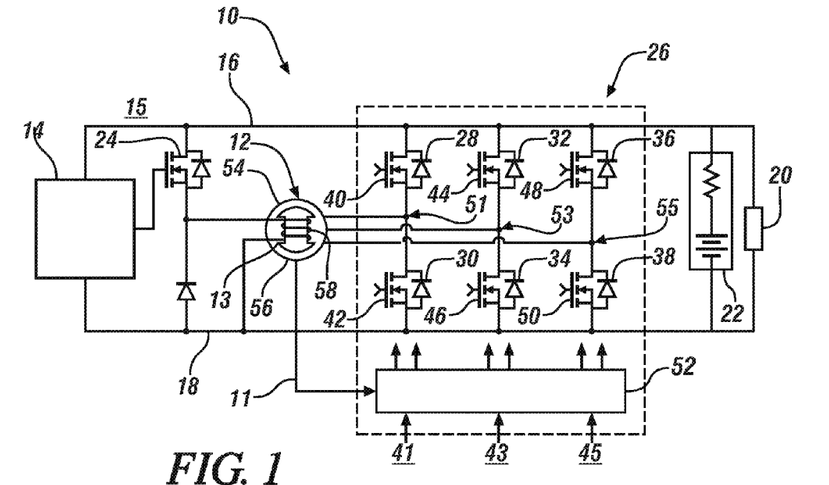
FIG. 1 is a schematic diagram of a generator system including an active rectifier bridge employing MOSFET switches and rotor position feedback, according to an embodiment of the present invention.

Referring now to the drawings, wherein the showings are for the purpose of illustrating certain exemplary embodiments only, and not for the purpose of limiting the same, FIG. 1 schematically depicts a generator system 10, according to an embodiment of the present invention. The system 10 includes a three-phase wound rotor synchronous machine 12, such as a claw-pole machine, having a field coil 58 in a rotor 56 of the machine 12 and three-phase AC synchronous armature coils in a stator 54 of the machine 12. In another exemplary embodiment the system 10 may include a multi-phase wound rotor synchronous machine. In this non-limiting embodiment, the machine 12 is a Lundell machine. Permanent magnets can be incorporated in the rotor 56 of the machine 12 between the claw-poles to provide additional flux to that produced by the field coil 58, where the total flux is responsible to produce voltage in the armature coils.

The system 10 also includes a voltage regulator 14 that regulates the DC voltage $V_{dc}$ 15 produced between a positive rail 16 and a negative rail 18 of the system 10 by rectification of the generated AC voltage. The DC voltage is used to drive DC loads 20 in the vehicle, and to charge a vehicle battery 22, where the resistance Rbat is the internal resistance of the battery 22. The voltage regulator 14 provides pulse width modulation (PWM) control for the field coil 58 within the machine 12. Particularly, the voltage regulator 14 provides a signal to a MOSFET switch 24 that allows controlled current to be sent to the field coil 58.

The system 10 includes an inverter/rectifier circuit 26 having a plurality of diodes 28, 30, 32, 34, 36 and 38 that pass and block current flow to rectify the AC current from the armature coils to a DC current to operate the loads 20 and charge the vehicle battery 22. The inverter/rectifier circuit 26 also includes a plurality of MOSFET switches 40, 42, 44, 46, 48 and 50 that are coupled across the diodes 28, 30, 32, 34, 36 and 38, respectively, and provide a low resistance current path around the diode when the diode is conducting, i.e., when current is flowing in a forward bias direction through the diode. A switch control circuit 52 controls whether the switches 40, 42, 44, 46, 48 and 50 are open or closed in association with whether the diode 28, 30, 32, 34, 36 or 38 is conducting. The diodes 28, 30, 32, 34, 36 and 38 can be integral body-drain diodes within the respective MOSFET switches 40, 42, 44, 46, 48 and 50. Additionally, the diode 28, 30, 32, 34, 36 and 38 can be zener diodes having a voltage clamping capability when subjected to reverse overvoltage in excess of a reverse breakdown voltage.

The phase-to-ground voltages $V_A$ 41, $V_B$ 43 and $V_C$ 45 between the stator terminals, identified by nodes A 51, B 53 and C 55 in the circuit 26, and battery ground or the negative rail 18, are input to the control circuit 52 to determine the control signal that opens/closes the MOSFET switches 40, 42, 44, 46, 48 and 50. Voltage divider circuits can be employed to divide the phase voltages between the nodes A 51, B 53 and C 55 and the ground rail 18 to a level suitable for the control circuit 52. This information allows the control circuit 52 to know which of the switches 40, 42, 44, 46, 48 and 50 to close to provide the current rectification. Particularly, when the appropriate diode 28, 30, 32, 34, 36 and 38 is conducting for providing rectification, the switch 40, 42, 44, 46, 48 and 50 associated with that diode 28, 30, 32, 34, 36 and 38 is closed to provide a low current path that bypasses the diode 28, 30, 32, 34, 36 and 38. Output lines from the control circuit 52 are applied to the gate terminal of the MOSFET switches 40, 42, 44, 46, 48 and 50 to provide the signal that closes the switch.

In known generator systems using active bridge rectifiers including MOSFET switches 40, 42, 44, 46, 48 and 50 the turn-on and turn-off points of each MOSFET switch 40, 42, 44, 46, 48 and 50 may be controlled to provide rectification by comparing the phase-to-phase voltages with a predetermined upper and lower threshold level during positive and negative half-cycles of the output waveform from the machine 12. The control circuit 52 for the MOSFET switches 40, 42, 44, 46, 48 and 50 also detects the generator speed (RPM) using the frequency of one or more of the phase-to-ground voltages $V_A$ 41, $V_B$ 43 and $V_C$ 45. For generator speeds below a predetermined threshold, the switching of the MOSFET switches 40, 42, 44, 46, 48 and 50 is disabled to prevent undesirable discharge of the battery 22 through the generator windings.

In the exemplary embodiment of FIG. 1, the wound rotor synchronous machine 12 of generator system 10 further provides rotor position feedback 11 to control circuit 52. Accordingly, the MOSFET switches 40, 42, 44, 46, 48 and 50 may be controlled as synchronous rectifiers and have the capability of being controlled using the rotor position feedback 11 to produce increased output power. Rotor position feedback 11 may be provided by a direct or indirect rotor position sensing capability. In the exemplary embodiment of FIG. 1, a rotor position sensor 13 may be included in generator system 10 to provide rotor position feedback 11. An exemplary rotor position sensing capability, such as rotor position sensor 13, may include digital or analog Hall Effect sensors. The Hall Effect sensors may have a predetermined resolution, for instance 15° electrical. The control circuit 52 may control the MOSFET switches 40, 42, 44, 46, 48 and 50 of the active bridge rectifier as synchronous rectifiers using the rotor position feedback 11 to produce increased output power of the high-efficiency generator system 10. By adjusting a phase angle between the phase current and the terminal or induced voltage of the machine 12 is capable of achieving a higher output DC current and a higher output power over a preferred operating speed range.

This method of controlling the MOSFET switches 40, 42, 44, 46, 48 and 50 of the active bridge rectifier as synchronous rectifiers using the rotor position feedback 11 provides a number of advantages over known high efficiency generators with an active bridge rectifier. In these known generators using active bridge rectifiers without phase angle control the phase angle between the phase voltage and current is fixed, and accordingly the maximum output current/power is also fixed for a given generator speed and output voltage. Controlling the MOSFET switches 40, 42, 44, 46, 48 and 50 of the active bridge rectifier as synchronous rectifiers using the rotor position feedback 11 enables higher maximum current and power output at a preferred speed range, higher level of energy recuperation, and fast torque and voltage response. Additionally, this method allows for potential downsizing of the generator system 10 to reduce cost, improvement in the reliability of the charging system through better charge balance, and potential reduction in battery warranty costs.

MOSFET control circuit 52 receives rotor position feedback 11 from a rotor position sensor 13 on machine 12. Rotor position feedback 11 may provide the actual phase relationship (phase angle) between the phase current and the terminal or induced voltage of the machine 12. The phase angle is controllable by controlling the switching instants of the MOSFET switches 40, 42, 44, 46, 48 and 50, with respect to the phase voltage. In the exemplary embodiment of FIG. 1, MOSFET control circuit 52 can utilize look-up tables to determine an optimal control angle for the rotor position of machine 12, and based on the rotor position feedback 11 can control MOSFET switches 40, 42, 44, 46, 48 and 50 to achieve the optimal control angle for the rotor position of machine 12. The look-up table may be used to determine the optimal control angle, for instance the phase angle at which the output power of the generator system 10 is the greatest, at any given generator speed and voltage. In an exemplary embodiment, at lower generator speeds a higher phase angle may yield higher output power, while at higher generator speeds the benefit of the higher phase angle may be lost. In another embodiment phase angle may be determined using look-up tables based on achieving increased efficiency rather than output power. The use of the synchronous rectifier with phase angle control in generator system 10 may additionally be used to achieve a faster dynamic response, for instance in responding to a change in a voltage command or torque command to the machine 12. A desired phase angle between the phase current and the terminal or induced voltage of the machine may be determined based on achieving a desired objective, including increasing output dc current and power over a preferred operating speed range, achieving a faster torque response than would be achieved without phase angle control, and achieving a faster voltage response than would be achieved without phase angle control.

Control module, module, control, controller, control unit, control, circuit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 100 microseconds, 3.125, 6.25, 12.5, 25 and 100 milliseconds during ongoing engine and vehicle operation. Alternatively, routines may be executed in response to occurrence of an event.

Figure 2A:
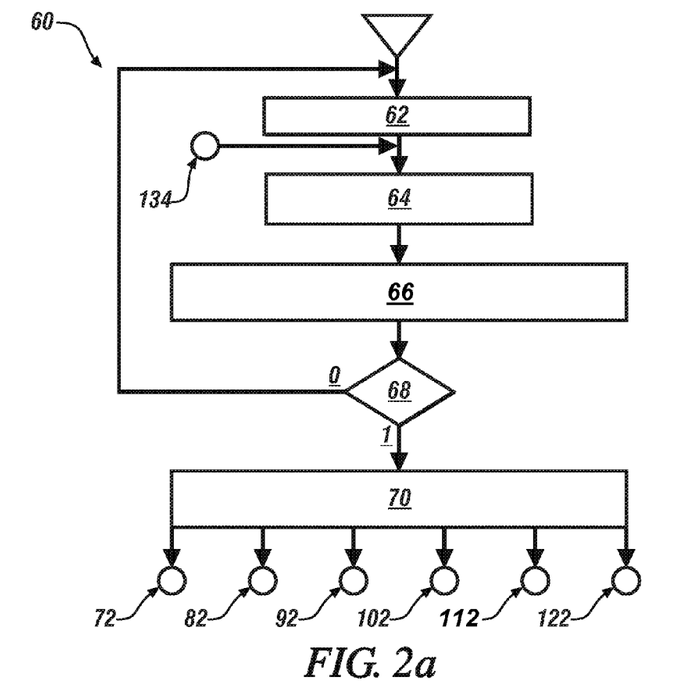
FIG. 2(a) is a flow chart diagram showing a process for selectively turning on and off the MOSFET switches in the generator system of FIG. 1, according to an embodiment of the present invention.
Figure 2B:
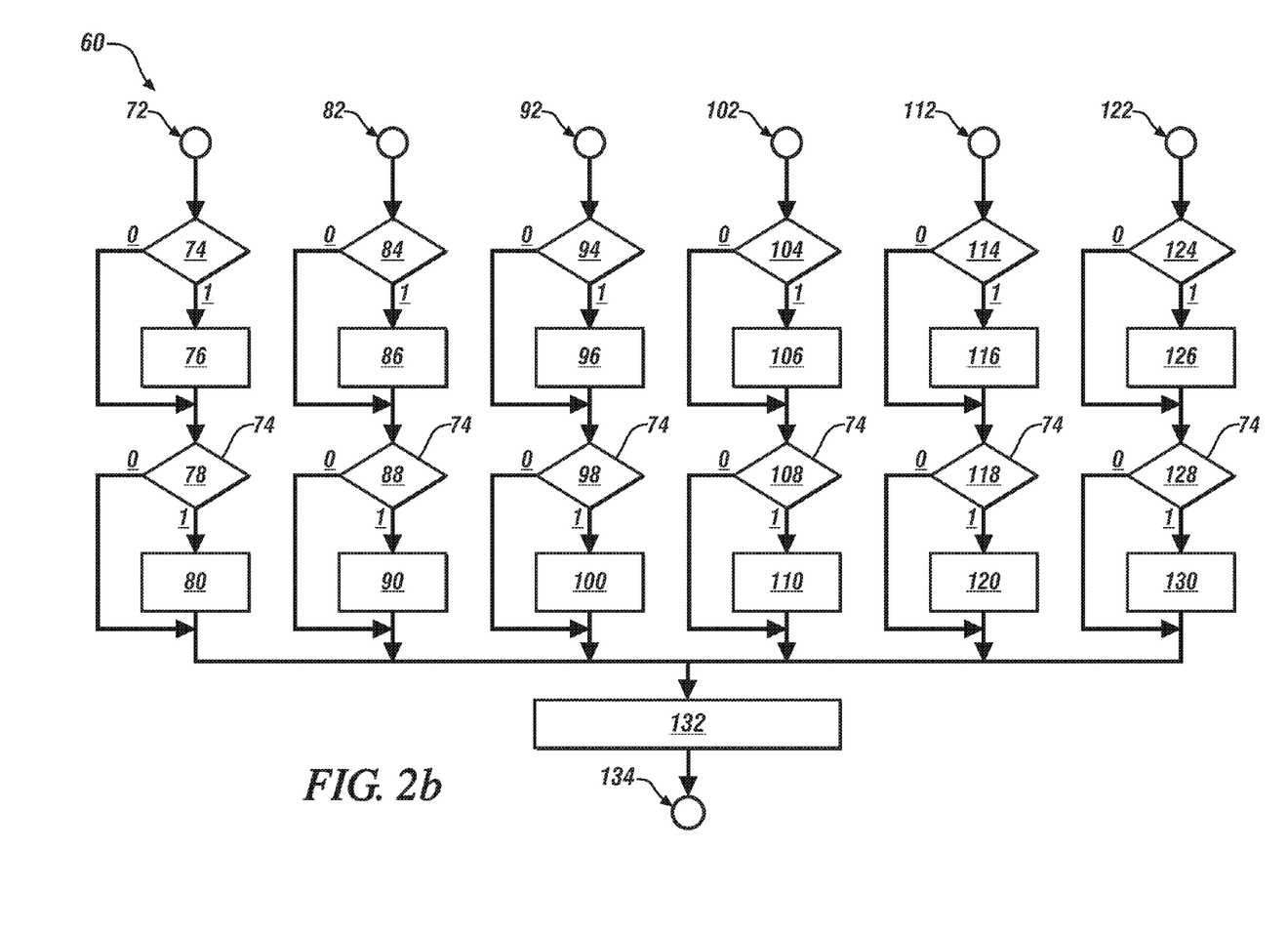
FIG. 2(b) is a flow chart diagram showing a process for selectively turning on and off the MOSFET switches in the generator system of FIG. 1, according to an embodiment of the present invention.

FIG. 2(a)-2(b) are a flow chart diagram 60 showing an operation for switching the MOSFET switches 40, 42, 44, 46, 48 and 50 to provide the current rectification, according to an embodiment of the present invention. The routine initializes the calibration parameters and disables (opens) the MOSFET switches 40, 42, 44, 46, 48 and 50 at box 62. The calibration parameters can include the voltage thresholds and the minimum RPM, both discussed below, used by the control circuit 52, and other system parameters necessary for the operation of the generator system 10.

The routine then measures the voltages between each phase and battery ground to get the phase-to-ground voltages $V_A$ 41, $V_B$ 43 and $V_C$ 45 for the inputs to the control circuit 52 at box 64. The phase-to-ground voltages $V_A$ 41, $V_B$ 43 and $V_C$ 45 may need to be attenuated or scaled to a level suitable for the digital circuitry in the control circuit 52. The routine then calculates the phase-to-phase voltages $V_{AB}$, $V_{BA}$, $V_{BC}$, $V_{CB}$, $V_{CA}$ and $V_{AC}$ from the phase-to-ground voltages $V_A$ 41, $V_B$ 43 and $V_C$ 45 as $V_A-V_B$, $V_B-V_A$, $V_B-V_C$, $V_C-V_B$, $V_C-V_A$ and $V_A-V_C$, respectively, at box 66. It is also possible to calculate $V_{BA}$, $V_{CB}$ and $V_{AC}$ directly from $V_{AB}$, $V_{BC}$ and $V_{CA}$ as $V_{BA}=-V_{AB}$, $V_{CB}=-V_{BC}$ and $V_{AC}=-V_{CA}$. It is also possible to measure the phase-to-phase voltages directly using differential amplifiers or other suitable devices.

The routine also determines the speed of the machine 12 at the box 66 using, for example, the frequency of one or more of the phase-to-ground voltages $V_A$ 41, $V_B$ 43 and $V_C$ 45 or the frequency of one or more of the phase-to-phase voltages $V_{AB}$, $V_{BC}$ and $V_{CA}$. The routine then determines whether the RPM of the machine 12 is greater than a predetermined threshold $RPM_{TH}$ at decision diamond 68, and if not, returns to the box 62 for initializing the calibration parameters. The routine prevents switching on of MOSFET switches 40, 42, 44, 46, 48 and 50 if the speed of the machine 12 is below a predetermined RPM to prevent undesirable discharge of the battery 22 through the machine windings.

If the speed of the machine 12 is greater than the threshold $RPM_{TH}$ at the decision diamond 68, then the routine compares the phase-to-phase voltages for each of the MOSFET switches 40, 42, 44, 46, 48 and 50 with predetermined threshold voltages $V_{T1+}$ and $V_{TH-}$ at box 70. If a particular phase-to-phase voltage is above the threshold voltage $V_{TH1+}$, then the routine will close the switch 40, 42, 44, 46, 48 and 50 associated with that phase-to-phase voltage. If a particular phase-to-phase voltage for a MOSFET switch 40, 42, 44, 46, 48 and 50 is below the threshold $V_{TH1-}$, then the control circuit 52 will cause that switch to be opened. Once the particular MOSFET switch 40, 42, 44, 46, 48 and 50 is opened or closed it will stay in that position until the threshold is crossed to change its state. The threshold voltages $V_{TH1+}$ and $V_{TH1-}$ are selected so that the particular MOSFET switch 40, 42, 44, 46, 48 and 50 will be opened or closed to follow the conduction of the associated diode. In one embodiment, the threshold voltage $V_{TH1+}$ is in the range of Vdc±1V, or in the range of $V_{dc}$ to $V_{dc}+0.25V$, where $V_{dc}$ is the voltage across the positive rail 16 and the negative rail 18. In one embodiment, the threshold voltage $V_{TH1-}$ is in the range of ±1V or in the range of −10 mV to +10 mV.

Each comparison of the phase-to-phase voltages for each of the MOSFET switches 40, 42, 44, 46, 48 and 50 is shown on a separate channel 72, 82, 92, 102, 112 and 122 respectively. The routine determines whether the phase-to-phase voltage for the particular MOSFET switch 40, 42, 44, 46, 48 and 50 is greater than the predetermined threshold voltage $V_{TH1+}$ at decision diamond 74. If the phase-to-phase voltage is greater than the threshold voltage $V_{TH1+}$ at the respective decision diamond 74, 84, 94, 104, 114 and 124, then the routine closes that particular MOSFET switch 40, 42, 44, 46, 48 and 50 at the respective one of box 76, 86, 96, 106, 116 and 126. Otherwise, the routine maintains the MOSFET switch 40, 42, 44, 46, 48 and 50 in its previous state. The routine then determines whether the phase-to-phase voltage is less than the threshold voltage $V_{TH1-}$ at decision diamond 78, 88, 98, 108, 118 and 128, and if so, opens the MOSFET switch 40, 42, 44, 46, 48 and 50 at box 80, 90, 100, 110, 120 and 130. Otherwise, the MOSFET switch 40, 42, 44, 46, 48 and 50 remains in its previous state. All of the output signals are then sent to the MOSFET switches 40, 42, 44, 46, 48 and 50 at box 132 and the process returns at point 134 to the box 64.

It is envisioned that the voltage regulation function and the MOSFET control function could be independently provided by separate electronic control circuits or both functions could be integrated into a single electronic control circuit. The electronic control circuit may be implemented using a combination of discrete and/or integrated circuits, a microcontroller, a digital signal processor or an application specific integrated circuit (ASIC).

By using the MOSFET switches and the control method discussed above, the generator system 10 has a number of advantages over those generator systems that employed diode only rectifier bridges. Particularly, the generator system 10 has a significant reduction in generator rectification losses, a significant reduction in operating temperature of the heat sink, a potential to reduce the fan loss and noise by decreasing the fan air flow due to reduced heat load, an improvement in overall efficiency of the generator system 10, and an improvement in vehicle fuel economy.

Figure 31:
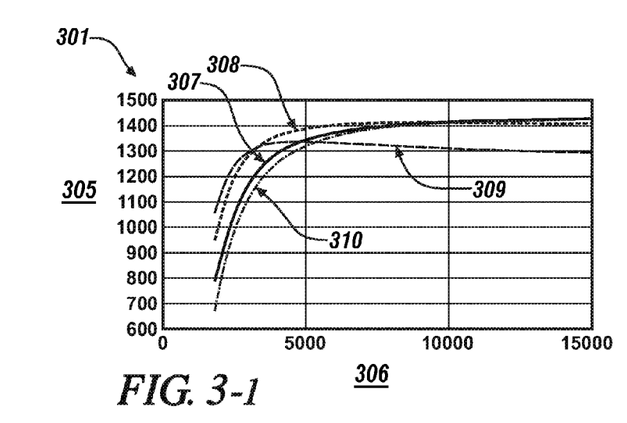

FIG. 3-1 graphically depicts plot 301 of the output power 305 of a generator system, at 12 volts. Horizontal axis 306 depicts generator speed in RPM. Vertical axis 305 depicts output power in Watts. Line 307 depicts the output power 305 at generator speed 306 in a generator system having a synchronous rectifier and a 0 degree phase angle between the phase current and induced voltage of the wound rotor synchronous machine. Line 308 depicts the output power 305 at generator speed 306 in a generator system having a synchronous rectifier and a 15 degree phase angle between the phase current and induced voltage of the wound rotor synchronous machine. Line 309 depicts the output power 305 at generator speed 306 in a generator system having a synchronous rectifier and a 30 degree phase angle between the phase current and induced voltage of the wound rotor synchronous machine. Line 310 depicts the output power 305 at generator speed 306 in a generator system having a diode bridge rectifier. At a low generator speed 306 the output power 305 is shown to be highest with a 30 degree phase angle 309. As the generator speed 306 approaches 5000 RPM the generator system operating with a 15 degree phase angle 308 is shown to produce a higher output power 305. As the generator speed 306 exceeds 10000 RPM, the generator system operating with 0 degree phase angle 307 is shown to produce the most output power 305.

Figure 32:
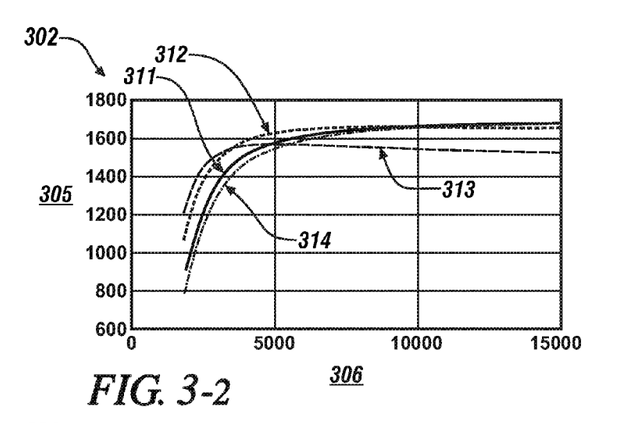

FIG. 3-2 graphically depicts plot 302 of the output power 305 of a generator system, at 13 volts. Horizontal axis 306 depicts generator speed in RPM. Vertical axis 305 depicts output power in Watts. Line 311 depicts the output power 305 at generator speed 306 in a generator system having a synchronous rectifier and a 0 degree phase angle between the phase current and induced voltage of the wound rotor synchronous machine. Line 312 depicts the output power 305 at generator speed 306 in a generator system having a synchronous rectifier and a 15 degree phase angle between the phase current and induced voltage of the wound rotor synchronous machine. Line 313 depicts the output power 305 at generator speed 306 in a generator system having a synchronous rectifier and a 30 degree phase angle between the phase current and induced voltage of the wound rotor synchronous machine. Line 314 depicts the output power 305 at generator speed 306 in a generator system having a diode bridge rectifier. At a low generator speed 306 the output power 305 is shown to be highest with a 30 degree phase angle 313. As the generator speed 306 approaches 5000 RPM the generator system operating with a 15 degree phase angle 312 is shown to produce a higher output power 305. As the generator speed 306 exceeds 10000 RPM, the generator system operating with 0 degree phase angle 311 is shown to produce the most output power 305.

Figure 33:
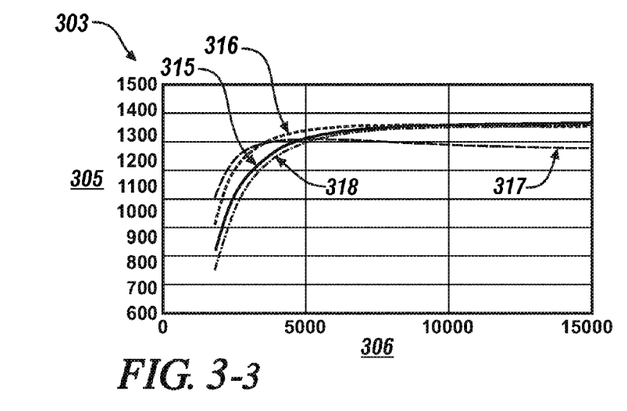

FIG. 3-3 graphically depicts plot 303 of the output power 305 of a generator system, at 14 volts. Horizontal axis 306 depicts generator speed in RPM. Vertical axis 305 depicts output power in Watts. Line 315 depicts the output power 305 at generator speed 306 in a generator system having a synchronous rectifier and a 0 degree phase angle between the phase current and induced voltage of the wound rotor synchronous machine. Line 316 depicts the output power 305 at generator speed 306 in a generator system having a synchronous rectifier and a 15 degree phase angle between the phase current and induced voltage of the wound rotor synchronous machine. Line 317 depicts the output power 305 at generator speed 306 in a generator system having a synchronous rectifier and a 30 degree phase angle between the phase current and induced voltage of the wound rotor synchronous machine. Line 318 depicts the output power 305 at generator speed 306 in a generator system having a diode bridge rectifier. At a low generator speed 306 the output power 305 is shown to be highest with a 30 degree phase angle 317. As the generator speed 306 approaches 5000 RPM the generator system operating with a 15 degree phase angle 316 is shown to produce a higher output power 305. As the generator speed 306 exceeds 10000 RPM, the generator system operating with 0 degree phase angle 315 is shown to produce the most output power 305.

Figure 34:
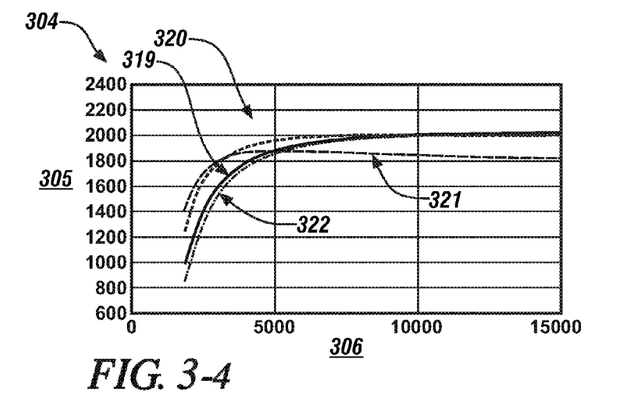

FIG. 3-4 graphically depicts plot 304 of the output power 305 of a generator system, at 15 volts. Horizontal axis 306 depicts generator speed in RPM. Vertical axis 305 depicts output power in Watts. Line 319 depicts the output power 305 at generator speed 306 in a generator system having a synchronous rectifier and a 0 degree phase angle between the phase current and induced voltage of the wound rotor synchronous machine. Line 320 depicts the output power 305 at generator speed 306 in a generator system having a synchronous rectifier and a 15 degree phase angle between the phase current and induced voltage of the wound rotor synchronous machine. Line 321 depicts the output power 305 at generator speed 306 in a generator system having a synchronous rectifier and a 30 degree phase angle between the phase current and induced voltage of the wound rotor synchronous machine. Line 322 depicts the output power 305 at generator speed 306 in a generator system having a diode bridge rectifier. At a low generator speed 306 the output power 305 is shown to be highest with a 30 degree phase angle 321. As the generator speed 306 approaches 5000 RPM the generator system operating with a 15 degree phase angle 320 is shown to produce a higher output power 305. As the generator speed 306 exceeds 10000 RPM, the generator system operating with 0 degree phase angle 319 is shown to produce the most output power 305.

Figure 41:
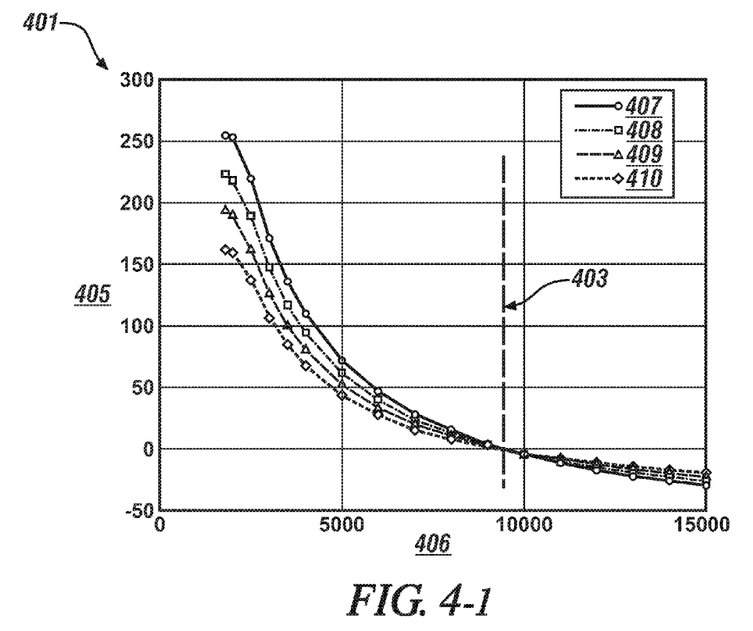

FIG. 4-1 graphically depicts plot 401 showing an increase in output power of a generator system having a synchronous rectifier and operating with a 15 degree phase angle control at a range of voltages. The phase angle between the phase current and induced voltage of the wound rotor synchronous machine is retarded by 15 degrees. Vertical axis 405 shows the increase in output power of the generator system in Watts. The increase in output power 405 is in comparison to a generator system having an active bridge rectifier with no phase angle control. Horizontal axis 406 shows the generator speed in RPM. The increase in output power is depicted for generator systems having a synchronous rectifier operating at each of a range of voltages. Plot 407 depicts the increase in output power 405 for a generator system operating at 12V with a 15 degree phase retard. Plot 408 depicts the increase in output power 405 for a generator system operating at 13V with a 15 degree phase retard. Plot 409 depicts the increase in output power 405 for a generator system operating at 14V with a 15 degree phase retard. Plot 410 depicts the increase in output power 405 for a generator system operating at 15V with a 15 degree phase retard. Vertical line 403 depicts the generator speed 406 at which the increase in power 405 is zero at each of voltages 407, 408, 409 and 410. At each of the voltages 407, 408, 409 and 410 the output power of the generator having a synchronous rectifier shows significant increase over a generator having an active bridge rectifier without phase angle control at low generator speeds 406 prior to generator speed 403. Increased output at low operating speeds with the proposed method of phase angle control using a synchronous rectifier can be utilized to improve the charge balance of the battery. This additionally enables potential downsizing of the generator, which may reduce cost.

Figure 42:
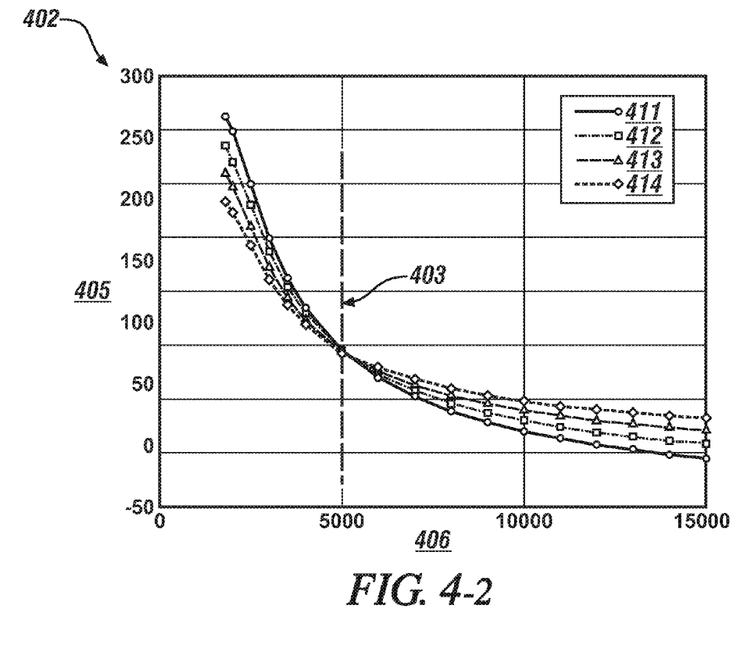

FIG. 4-2 graphically depicts plot 402 showing an increase in output power of a generator system having a synchronous rectifier and operating with a 30 degree phase angle control at a range of voltages. The phase angle between the phase current and induced voltage of the wound rotor synchronous machine is retarded by 30 degrees. Vertical axis 405 shows the increase in output power of the generator system in Watts. The increase in output power 405 is in comparison to a generator system having an active bridge rectifier with no phase angle control. Horizontal axis 406 shows the generator speed in RPM. The increase in output power is depicted for generator systems having a synchronous rectifier operating at each of a range of voltages. Plot 411 depicts the increase in output power 405 for a generator system operating at 12V with a 30 degree phase retard. Plot 412 depicts the increase in output power 405 for a generator system operating at 13V with a 30 degree phase retard. Plot 413 depicts the increase in output power 405 for a generator system operating at 14V with a 30 degree phase retard. Plot 414 depicts the increase in output power 405 for a generator system operating at 15V with a 30 degree phase retard. Vertical line 404 depicts the generator speed 406 at which the increase in power 405 is zero at each of voltages 411, 412, 413 and 414. At each of the voltages 411, 412, 413 and 414 the output power of the generator having a synchronous rectifier shows significant increase over a generator having an active bridge rectifier without phase angle control at low generator speeds 406 prior to generator speed 404. Increased output at low operating speeds with the proposed method of phase angle control using a synchronous rectifier can be utilized to improve the charge balance of the battery. This additionally enables potential downsizing of the generator, which may reduce cost.

Figure 51:
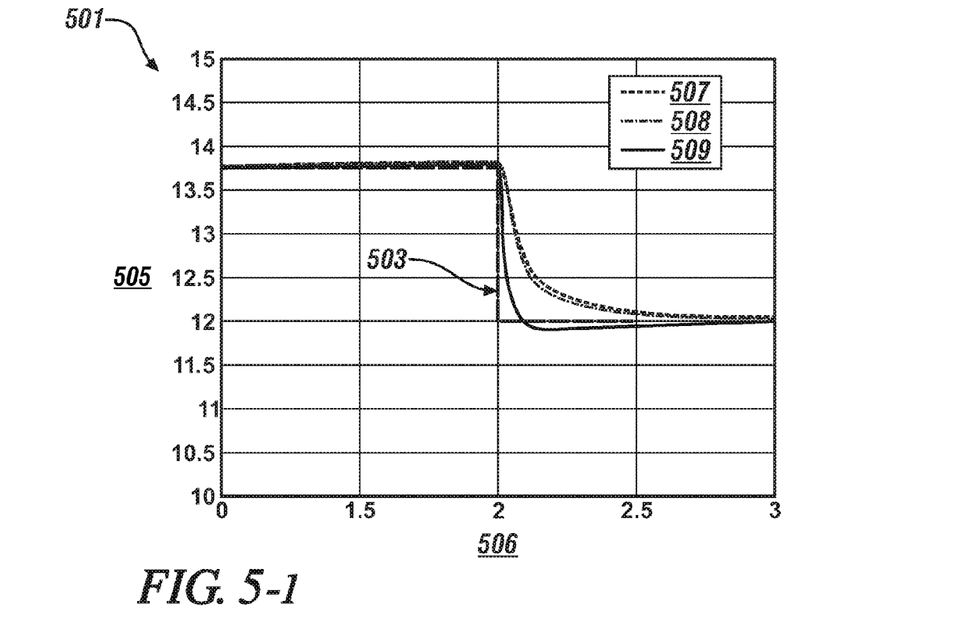

FIG. 5-1 graphically depicts plot 501 showing voltage control both with and without phase advance in a generator system operating at 1800 RPM. Horizontal axis 506 depicts time in seconds. Vertical axis 505 depicts voltage in volts. Plot 507 depicts the voltage 505 over time 506 of a generator system having a diode bridge rectifier. Plot 508 depicts the voltage 505 over time 506 of a generator system having a synchronous rectifier. Plot 509 depicts the voltage 505 over time 506 of a generator system having a synchronous rectifier with phase angle control. At a time of 1 second the voltage command 503 is set to 13.8V. At a time of 2 seconds the voltage command 503 is decreased to 12V. The proposed phase angle control method, depicted by plot 509, achieves a significantly faster response to the step change in voltage command 503 from 13.8V to 12V at the 2 second point.

Figure 52:
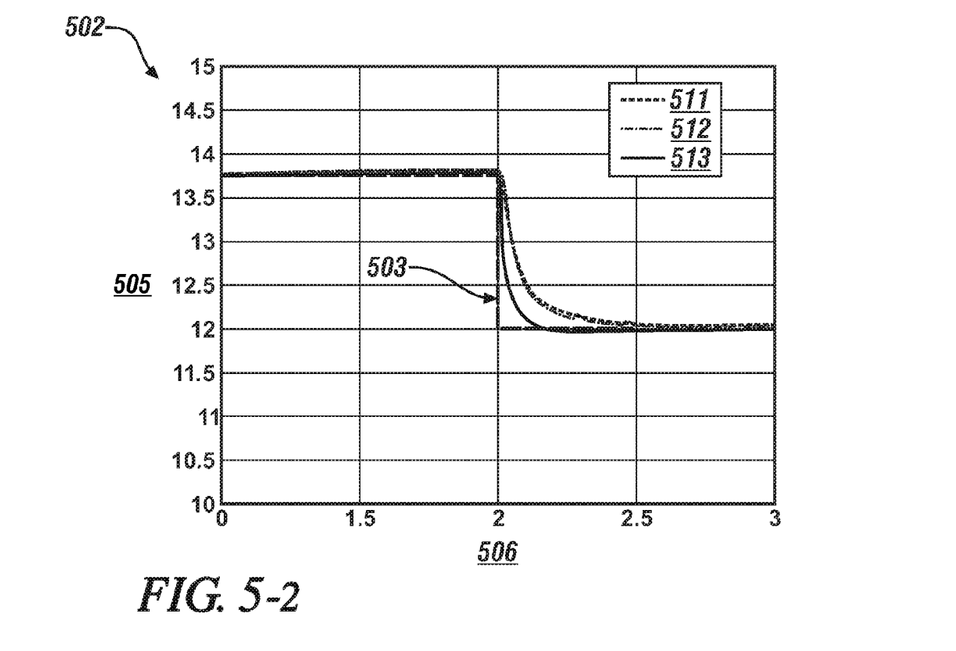

FIG. 5-2 graphically depicts plot 502 showing voltage control both with and without phase advance in a generator system operating at 3000 RPM. Horizontal axis 506 depicts time in seconds. Vertical axis 505 depicts voltage in volts. Plot 511 depicts the voltage 505 over time 506 of a generator system having a diode bridge rectifier. Plot 512 depicts the voltage 505 over time 506 of a generator system having a synchronous rectifier. Plot 513 depicts the voltage 505 over time 506 of a generator system having a synchronous rectifier with phase angle control. At a time of 1 second the voltage command 503 is set to 13.8V. At a time of 2 seconds the voltage command 503 is decreased to 12V. The proposed phase angle control method, depicted by plot 513, achieves a significantly faster response to the step change in voltage command 503 from 13.8V to 12V at the 2 second point.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A generator system comprising:
    an AC machine including a plurality of armature coils producing multi-phase AC output voltages;
    a rectifier circuit electrically coupled to the armature coils, said rectifier circuit including a plurality of switches; and
    a sensor device electrically coupled to a control circuit, said sensor device configured to determine a rotor position of the AC machine;
    said control circuit determining rotor speed, determining a desired phase angle between a phase current and respective AC output voltage of the AC machine based upon the rotor speed and the multi-phase AC output voltages, and providing a control signal to the rectifier circuit to switch the switches on and off to convert said multi-phase AC output to a DC output and to achieve the desired phase angle.

2. The generator system of claim 1 wherein the sensor device configured to determine the rotor position of the AC machine comprises a Hall-effect sensor with a predetermined resolution.

3. The generator system of claim 1 wherein determining the desired phase angle between the phase current and the respective AC output voltage of the AC machine comprises using a look-up table.

4. The generator system of claim 1 wherein determining the desired phase angle between the phase current and the respective AC output voltage of the AC machine is further based on achieving an increased output DC current and an increased power of the generator system over a preferred operating speed range.

5. The generator system of claim 1 wherein determining the desired phase angle between the phase current and the respective AC output voltage of the AC machine is further based on achieving an increased efficiency of the generator system.

6. The generator system of claim 1 wherein determining the desired phase angle between the phase current and the respective AC output voltage of the AC machine is based on achieving a faster torque response.

7. The generator system of claim 1 wherein determining the desired phase angle between the phase current and the respective AC output voltage of the AC machine is based on achieving a faster voltage response.

8. A method for controlling a generator comprising an active bridge rectifier circuit including a plurality of switches, said method comprising:
    monitoring a sensor device configured to determine a rotor position of an AC machine of the generator, said AC machine producing a multi-phase AC output comprising a plurality of phase voltages;
    determining a desired phase angle between a phase current and an induced voltage of the AC machine of the generator based upon the rotor position;
    determining phase-to-phase voltages from the plurality of phase voltages;
    determining rotor speed;

comparing said phase-to-phase voltages to upper and lower voltage thresholds;

at rotor speeds below a predetermined speed generating a control signal to the active bridge rectifier circuit to switch all switches of the active bridge rectifier circuit off; and at rotor speeds above said predetermined speed generating a control signal to the active bridge rectifier circuit to control the switches based upon the desired phase angle and the comparison of said phase-to-phase voltages to said upper and lower voltage thresholds to convert said multi-phase AC output to a DC output and to achieve the desired phase angle.

9. The method of claim 8, wherein determining the desired phase angle between the phase current and the induced voltage of the AC machine of the generator comprises determining said desired phase angle to achieve an increased output DC current and an increased power of the generator system over a preferred operating speed range.

10. The method of claim 8, wherein determining the desired phase angle between the phase current and the induced voltage of the AC machine of the generator comprises determining said desired phase angle to achieve an increased efficiency of the generator.

11. The method of claim 8, wherein determining the desired phase angle between the phase current and the induced voltage of the AC machine of the generator comprises determining said desired phase angle to achieve a faster torque response.

12. The method of claim 8, wherein determining the desired phase angle between the phase current and the induced voltage of the AC machine of the generator comprises determining said desired phase angle to achieve a faster voltage response.

13. The method of claim 8 wherein determining the desired phase angle between the phase current and the induced voltage of the AC machine of the generator comprises using a look-up table.

14. The method of claim 8 wherein the sensor device configured to determine the rotor position of the AC machine of the generator comprises a Hall-effect sensor with a predetermined resolution.

15. A high efficiency generator system comprising:

an AC machine including a plurality of armature coils producing a multi-phase AC output comprising a plurality of phase voltages;

an active bridge rectifier circuit electrically coupled to the armature coils, said rectifier circuit including a plurality of switches; and a sensor device for sensing a rotor position of the AC machine;

a control circuit, comprising a processor and memory, to receive the rotor position from the sensor device, determine a desired phase angle between a phase current and an induced voltage of the AC machine based upon the rotor position, determine phase-to-phase voltages from the plurality of phase voltages, compare said phase-to-phase voltages to upper and lower voltage thresholds, control all switches of the active bridge rectifier circuit off at rotor speeds below a predetermined speed, and control the switches of the active bridge rectifier circuit based upon the desired phase angle and the comparison of said phase-to-phase voltages to said upper and lower voltage thresholds at rotor speeds above said predetermined speed to convert said AC output to a DC output and to achieve the desired phase angle.

16. The high efficiency generator system of claim 15 wherein the desired phase angle between the phase current and the induced voltage of the AC machine is further determined based upon achieving an increased output DC current and an increased power of the generator system over a preferred operating speed range.

17. The high efficiency generator system of claim 15 wherein the desired phase angle between the phase current and the induced voltage of the AC machine is further determined based upon achieving an increased efficiency of the generator system.

18. The high efficiency generator system of claim 15 wherein the desired phase angle between the phase current and the induced voltage of the AC machine is further determined based upon achieving a faster torque response.

19. The high efficiency generator system of claim 15 wherein the desired phase angle between the phase current and the induced voltage of the AC machine is further determined based upon achieving a faster voltage response.

20. The high efficiency generator system of claim 15 wherein the sensor device comprises a Hall-effect sensor with a predetermined resolution.

* * * * *